Feb. 23, 1965   D. B. JOHNSON   3,170,407
MOTOR-PUMP UNIT
Filed March 12, 1962
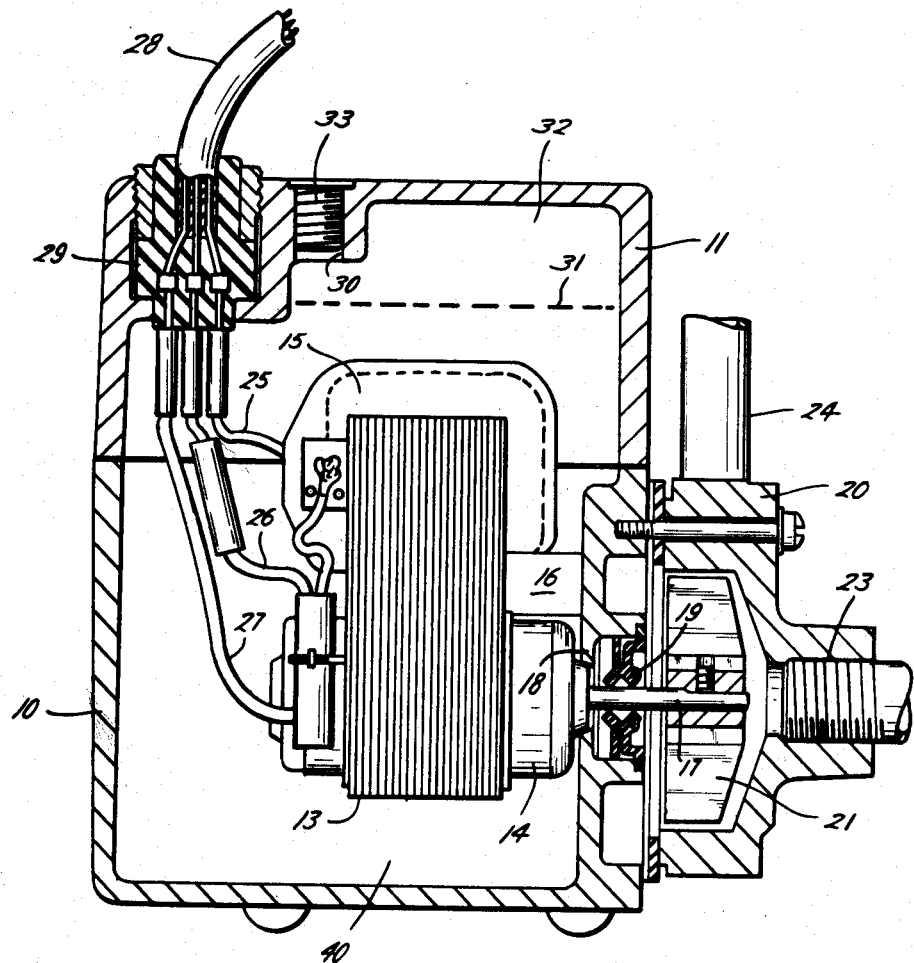
Damon B. Johnson
INVENTOR.
BY
ATTORNEY

3,170,407
MOTOR-PUMP UNIT
Damon B. Johnson, Oklahoma City, Okla., assignor to Little Giant Corporation, Oklahoma City, Okla., a corporation of Oklahoma
Filed Mar. 12, 1962, Ser. No. 178,932
3 Claims. (Cl. 103—87)

This invention pertains to small oil cooled electric motor driven pumps of fractional horsepower capacity.

The object of the invention is to provide improved cooling for the motor to prolong its life.

According to the invention means is provided which simultaneously produces additional cooling area for the oil, a pressure relief chamber to prevent extraneous liquid from the pump chamber being sucked past the shaft seal into the motor chamber where it will contaminate the oil, and a flotation chamber for the dissipation of light foreign material from the oil.

For a detailed description reference will now be made to the accompanying drawing wherein the figure is a sectional view of an electric motor driven pump embodying the invention.

The motor-pump includes a cubical two-piece motor housing having a lower part 10 and an upper part 11, the joint therebetween being a sealing fit with plastic sealing material therebetween. The two parts are held together by through bolts at the corners, not shown.

An electric motor inside the housing includes stator lamination 13 within which rotates rotor 14 and an electric coil 15 wound on the stator. A stud 16 secures the stator to one side of the housing. The motor shaft 17 extends through a hole 18 in the housing and thence through a flexible lip type seal 19.

A pump housing 20 is secured to the side of the motor housing over the hole 18. A centrifugal pump impeller 21 is mounted within pump housing 21 on motor shaft 17 to which it is keyed. The pump housing has an inlet pipe 23 and one outlet pipe 24.

The coil 15 of the motor has ends 25, 26, which together with ground wire 27, connect to electrical cable 28 through electric inlet seal unit 29.

The casing is filled with oil through port 30 to a level 31 above the top of the coil 15 but leaving an air space 32 thereabove. The port 30 is closed fluid tight with a screw plug 33.

It will be apparent that because the motor housing is not completely full of oil, the oil can expand with heat and compress the air slightly in the air space instead of having to leak out through the lip seal 19. Therefore when the oil cools, there is no vacuum produced inside the housing and no pump liquid is sucked back into the motor housing to contaminate the oil therein. However should any such pump fluid leak into the oil chamber, same can rise to the surface of the oil and separate therefrom and float on top without doing any harm. This is very important where light volatile fluids are being pumped. Since the motor is secured to the side of the housing above the bottom thereof, any heavy foreign materials can collect in the space 40 at the bottom of the housing without doing any harm. Finally, the added metal housing required to provide the air space above the oil and the clearance between the motor and bottom of the housing provides additional cooling area to keep the metal of the housing cool and thereby cool the oil more efficiently.

I claim:
1. A motor-pump unit having a motor housing and a pump housing adjacent thereto with an aperture therebetween, an electric motor mounted in the motor housing, said motor having a stator and a rotor and a stator coil all of which are spaced apart from the top and bottom of the motor housing, said rotor having a horizontal shaft extending through said aperture into said pump housing and carrying a pump impellor thereon in said pump housing, a seal around said shaft between said shaft and the aperture in the housing, said motor housing and pump housing being disposed side by side as distinct from one on top of the other, said motor housing including an uppermost portion asymmetric with respect to the axis of said shaft extending above the uppermost portion of said pump housing providing a chamber radially spaced from said shaft axis, said motor housing being totally closed, and oil in said motor housing extending from the bottom to a level above the top of the motor coil and stator but below the top of the housing leaving an air space therebetween in said chamber, the air in said chamber being at atmospheric pressure when said oil is cool, i.e. unheated by operation of the pump.

2. The combination of claim 1 wherein said seal is a flexible lip type seal.

3. The combination of claim 1 wherein said motor housing includes a lower part and an upper part, said housing parts being made of metal, the joint between said parts being a sealing fit with plastic sealing material therebetween, said uppermost portion of said motor housing being in said upper part of said housing.

References Cited by the Examiner
UNITED STATES PATENTS

| 2,107,481 | 2/38 | Johnson | 103—87 |
| 2,791,967 | 5/57 | Klauss | 103—87 |

FOREIGN PATENTS

| 976,373 | 3/51 | France. |
| 880,548 | 6/53 | Germany. |

LAURENCE V. EFNER, *Primary Examiner.*
ROBERT M. WALKER, JOSEPH H. BRANSON, Jr., *Examiners.*